[11] 3,543,856

| [72] | Inventors | John A. Knox;<br>Sherman E. Frederickson; Gene C. Broaddus, Duncan, Oklahoma |
|---|---|---|
| [21] | Appl. No. | 851,455 |
| [22] | Filed | Aug. 19, 1969 |
| [45] | Patented | Dec. 1, 1970 |
| [73] | Assignee | Halliburton Company<br>Duncan, Oklahoma<br>a corporation of Delaware |

[54] METHOD OF ACIDIZING WELLS
12 Claims, No Drawings

[52] U.S. Cl..................................... 166/281,
166/294, 166/307
[51] Int. Cl..................................... E21b 33/138,
E21b 43/27
[50] Field of Search......................... 166/281,
282, 292—294, 307, 312; 252/8.55C

[56] References Cited
UNITED STATES PATENTS

| 2,146,754 | 2/1939 | Maness........................ | 166/281 |
|---|---|---|---|
| 2,224,297 | 12/1940 | Holmes....................... | 252/8.55(C)UX |
| 2,337,295 | 12/1943 | Kennedy...................... | 166/281X |
| 2,367,350 | 1/1945 | Heigl........................... | 166/307 |
| 2,782,859 | 2/1957 | Garst........................... | 166/307X |

*Primary Examiner*—Ian A. Calvert
*Attorney*—Dunlap, Laney, Hessin & Dougherty

ABSTRACT: The present invention relates to a method of treating wells for the removal of drilling mud, water sensitive clays that have been subjected to water contact, or other materials containing silica or silicates to increase the productivity thereof. A well to be treated is preflushed with an aqueous ammonium chloride solution to displace water containing metallic ions such as calcium, sodium and potassium therefrom, and to stabilize the mud or clays so that migration thereof is minimized. An aqueous solution of hydrochloric acid and hydrofluoric acid is then introduced into said well to dissolve said mud, clays and other materials. Ammonium chloride particles in a carrying fluid may be initially introduced as a diverting agent.

METHOD OF ACIDIZING WELLS

BACKGROUND OF THE INVENTION

1. Field of the Invention

The present invention relates generally to a method of treating wells, and more particularly, but not by way of limitation, to a method of treating wells for the removal of drilling mud, clays or other materials wherein the well is treated with an aqueous solution of hydrochloric acid and hydrofluoric acid.

2. Description of the Prior Art

Various methods have been developed for increasing the productivity of oil, gas and water wells. One of the more common methods used for accomplishing this result is to inject acid into the well bore and after the acid has dissolved acid soluble material contained in the formation adjacent to the well bore, the spent acid is withdrawn.

In treating well formations which have been subjected to drilling mud invasion during the drilling thereof, or which contain water sensitive clays that have been subjected to water contact, or other materials containing silica or silicates, aqueous acid solutions comprised of a mixture of hydrochloric acid and hydrofluoric acid have been used with varying degrees of success. Aqueous hydrochloric-hydrofluoric acid solutions are very effective for removing drilling mud from well formations in that silicates contained in the muds are readily dissolved thereby. In addition, the hydrofluoric acid content has a dissolving action on silica and silicates that naturally occur in clays, silt, shale and sand. The hydrofluoric acid dissolves the silica and silicates to form fluosilicic acid and water. If the hydrofluoric acid content is spent on excess clay materials, the additional hydrochloric acid present will help shrink any clays contacted.

However, it has been observed that undesirable additional reactions take place when the hydrochloric-hydrofluoric acid mixture contacts metallic ions such as sodium, potassium, calcium, magnesium and others which are present in the formation being treated. For example, in treating formations containing calcium ions, a secondary deposition of calcium fluoride may result. The reaction is represented by the following equation:

$$Ca^{++} + 2F^- \rightarrow CaF_2 \text{ (Insoluble)}$$

Additionally, the fluosilicic acid formed in the reaction of hydrofluoric acid with silica and silicates will react with metallic ions such as sodium or potassium to form insoluble or partially insoluble salts of fluosilicic acid. These reactions may be represented by the following chemical equations:

$$6HF + SiO_2 \rightarrow H_2SiF_6 + 2H_2O$$

$$H_2SiF_6 + 2NaCl \rightarrow 2HCl + Na_2SiF_6 \text{ (insoluble)}$$
$$H_2SiF_6 + 2KCl \rightarrow 2HCl + K_2SiF_6 \text{ (insoluble)}$$

The metallic ions may be present in a particular formation as a result of water contained in the formation reacting with limestone, dolomite and other metallic salts. Also, certain types of well completion fluids and drilling muds used in drilling and completing well bores contain high concentrations of calcium, sodium, potassium, and other metallic ions. The formation of the above described insoluble or partially insoluble precipitates in the treated formation may severely damage the formation and decrease the permeability thereof.

Heretofore, an aqueous preflush solution of hydrochloric acid has been employed in an attempt to displace water containing metallic ions from the formation to be treated. However, it has been observed that hydrochloric acid contained in the preflush and treating solutions may react with mud and clays in the formation causing them to migrate with the treating solutions. Clay migration also decreases the treated formation permeability.

The present invention provides a method of treating well formations containing drilling mud, clays, and other materials containing silica and silicates with aqueous hydrochloric-hydrofluoric acid mixtures which overcomes the above-mentioned problems.

SUMMARY OF THE INVENTION

The present invention relates to a method of treating wells for the removal of mud, clay or other materials containing silica and silicates which comprises introducing a quantity of aqueous ammonium chloride solution into said well so that water contained therein is displaced and mud and clay contained therein are stabilized, subsequently introducing a quantity of an aqueous solution of hydrochloric acid and hydrofluoric acid into said well whereby said mud, clay and other materials contained therein are dissolved and removing said solutions and dissolved materials from said well.

It is, therefore, a general object of the present invention to provide a method of treating wells to increase the productivity thereof.

Another object of the present invention is the provision of a method of treating wells for the removal of mud, clay or other materials containing silica and silicates with an aqueous solution of hydrochloric acid and hydrofluoric acid wherein the formation of insoluble precipitates by secondary reactions with metallic ions contained in the formation is substantially decreased.

A further object of the present invention is the provision of a method for treating well formations containing mud, clays or other materials with aqueous solutions of hydrochloric-hydrofluoric acid wherein mud and clay migration is substantially prevented.

Yet a further object of the present invention is the provision of a method of treating wells with aqueous solutions of hydrochloric acid and hydrofluoric acid wherein ammonium chloride particles dispersed in a carrying fluid and a dilute aqueous ammonium chloride solution are introduced into the well prior to the hydrochloric-hydrofluoric acid solution to provide uniform distribution of the acid solution in the well, displacement of water contained in the well and stabilization of mud and clays contained in the well.

Other and further objects, features and advantages will be apparent from the following detailed description of presently preferred embodiments of the invention, given for the purpose of disclosure.

DESCRIPTION OF THE PREFERRED EMBODIMENTS

It has been discovered that dilute solutions of ammonium chloride are compatible with both live, partially spent and spent aqueous solutions of hydrochloric and hydrofluoric acid mixtures. That is, ammonium chloride will not react with hydrochloric acid-hydrofluoric acid mixtures to form insoluble precipitates or other materials detrimental to well treating. Furthermore, it has been found that when a particular quantity of dilute ammonium chloride solution is introduced into a well formation, water contained in the formation will be effectively displaced thereby. Thus, the well formation may be subsequently treated with an aqueous solution of a hydrochloric-hydrofluoric acid mixture for removal of drilling mud, clay or other material containing silica and silicates without contacting metallic ions contained in the formation water. Additionally, it has been found that aqueous ammonium chloride solutions bring about stabilization of mud or clays in well formations thereby substantially preventing clay migration with subsequently injected treating solutions. Thus, a quantity of aqueous ammonium chloride solution may be introduced into a well to be treated prior to introducing treating solutions containing hydrochloric and hydrofluoric acids therein thereby effectively minimizing the formation of secondary insoluble precipitates by the reaction of the treating solutions with metallic ions, and reducing clay migration with the treating solutions in the formation.

In another aspect of the present invention it has been found that particulated ammonium chloride solids dispersed in a carrying fluid may be employed as a diverting agent where open perforations or high permeability areas should be temporarily sealed to obtain more uniform distribution over the formation to be treated. The particulated ammonium chloride solids may be dispersed in a quantity of saturated aqueous ammonium chloride solution, oil, gelled oil, or other suitable carrying fluid, and pumped into the formation prior to introducing treating fluids therein. In the preferred form of this aspect of the present invention, a quantity of the ammonium chloride solids-carrying fluid dispersion is first pumped into the formation, a quantity of aqueous ammonium chloride solution is pumped into the formation to displace water contained therein and stabilize clays contained therein and then a quantity of aqueous hydrochloric acid-hydrofluoric acid solution is pumped into the formation so that the clays, drilling mud, or other materials containing silica or silicates are dissolved.

In both forms of the present invention, the aqueous hydrochloric-hydrofluoric acid mixture is allowed to react with acid soluble materials in the well formation until becoming spent, and then the treating solutions are removed from the formation in a conventional manner such as by swabbing, etc.

A preferred aqueous ammonium chloride solution for use in the present invention is comprised of ammonium chloride present in an amount of from about 1 percent by weight to a saturated solution. This solution may be prepared by dissolving a particular quantity of solid ammonium chloride in a given quantity of water.

A preferred aqueous solution of hydrochloric acid and hydrofluoric acid is comprised of hydrochloric acid present in the amount of from about 5 percent by weight to about 30 percent by weight, and hydrofluoric acid present in an amount of from about 1 percent by weight to about 15 percent by weight.

The aqueous solution of hydrochloric acid and hydrofluoric acid may be prepared by adding a quantity of ammonium bifluoride to a quantity of aqueous hydrochloric acid solution. For example, 4.4 percent ammonium bifluoride, by weight, added to a 15 percent solution of hydrochloric acid results in a mixture containing 3.1 percent hydrofluoric acid, by weight in a 12.5 percent solution of hydrochloric acid. A double strength solution may be prepared by adding 8.7 percent ammonium bifluoride, by weight, to a given quantity of 15 percent solution of hydrochloric acid. The resulting mixture contains 6.2 percent hydrofluoric acid in a 9.0 percent hydrochloric acid solution. For particular applications or specific well conditions, the concentrations of hydrochloric acid and hydrofluoric acid may be increased or decreased as needed.

As will be understood by those skilled in the art, the quantities of aqueous ammonium chloride solution and aqueous solution of hydrochloric and hydrofluoric acid used in the treatment of a particular well depends on a variety of factors such as the size of the formation being treated, the type of formation being treated, the type of materials to be dissolved by the acid, pumping rates, etc. Also, as will be understood, commercially available emulsion preventing, penetrating, and dispersing agents may be added to the treating solutions of the present invention. Additionally, foaming agents may be added to help induce foaming for more rapid recovery from gas wells, and also, to help suspend insoluble formation fines contained in the formation in the treating fluids. If retardation of the hydrochloric acid phase is desired, a commercially available retarding agent may be added to the hydrochloric-hydrofluoric acid solution.

In using particulated ammonium chloride particles dispersed in a carrying fluid for diverting the ammonium chloride solution and hydrochloric-hydrofluoric acid solutions of the present invention, the quantity and size of particulated ammonium chloride solids used in a particular application, as well as the quantity of carrying fluid employed depends upon the size of the formation being treated, the particular type of formation being treated, permeability, etc. Permeability logs and core analysis tests may be made on the formation to be treated before and after introducing the diverting agent of the present invention therein to determine the particular characteristics of ammonium chloride-carrying fluid dispersion required.

Several laboratory tests were made to determine the compatibility of ammonium chloride with hydrofluoric acid. The results of these tests are indicated hereinbelow.

PROCEDURE

Quantities of 6 percent by weight and 3 percent by weight aqueous hydrofluoric acid solutions were prepared, as well as a quantity of 2 percent by weight aqueous ammonium chloride solution. Test cores, 1 inch long by 1¾ inches in diameter taken from sandstone formations were prepared and placed in a directional controlled flow test cell.

The directional controlled flow test cell used in the tests consisted of a positive volume kerosene pump connected to the upper end of a cylindrical chamber having a floating piston disposed therein. A pressure recorder was connected to the pump discharge. The lower end of the cylindrical chamber was connected to a chamber for containing the test cores. In each test, the treating solution tested was placed in the lower portion of the cylindrical chamber below the floating piston. A constant rate of kerosene was then pumped into the cylindrical chamber on top of the floating piston, and the pressure recorded. As the kerosene forced the floating piston downwardly in the cylindrical chamber, the test solution was forced into the chamber containing a test core, through the test core in a predetermined direction and out of the chamber.

Each test core was preflushed with 2 percent by weight ammonium chloride solution at a temperature of 200° F. by forcing the solution through the core at a constant flow rate of 2.4 milliliters per minute (ml./min.). The cores were then treated with hydrofluoric acid solution at a temperature of 200° F. by forcing the acid solution through the cores at a constant flow rate of 2.4 ml./min. The permeability of each of the test cores was determined in a conventional manner form the pressure differential across the core, the core size, and the flow rates and viscosities of the test solutions throughout each test.

The results of these tests are shown in Tables I and II below.

TABLE I.—6% BY WEIGHT, HYDROFLUORIC ACID FLOW TESTS USING 2% BY WEIGHT AMMONIUM CHLORIDE SOLUTION PREFLUSH

| Treating solution | Elapsed time, minutes | Pressure, p.s.i.g. | Core permeability, m.d. |
| --- | --- | --- | --- |
| Ammonium chloride solution | Start | 180 | 0.178 |
| Do | 2 | 180 | 0.178 |
| Do | 5 | 165 | 0.195 |
| Do | 10 | 160 | 0.200 |
| Hydrofluoric acid solution | 14 | 160 | 0.200 |
| Do | 15 | 260 | 0.124 |
| Do | 18 | 17 | 1.89 |
| Do | 23 | 1 | 32.2 |

TABLE II.—3% BY WEIGHT HYDROFLUORIC ACID FLOW TEST USING 2% BY WEIGHT AMMONIUM CHLORIDE SOLUTION PREFLUSH

| Treating solution | Elapsed time, minutes | Pressure, p.s.i.g. | Core permeability, m.d. |
| --- | --- | --- | --- |
| Ammonium chloride solution | Start | 135 | 0.237 |
| Do | 5 | 140 | 0.230 |
| Do | 10 | 140 | 0.230 |
| Hydrofluoric acid solution | 13 | 135 | 0.235 |
| Do | 15 | 310 | 0.106 |
| Do | 16.5 | 330 | 0.095 |
| Do | 18.0 | 230 | 0.140 |
| Do | 23 | 4 | 8.00 |
| Do | 28 | 1 | 32.2 |

From the above data it may be seen that a 2 percent by weight aqueous ammonium chloride solution is compatible with 6 percent and 3 percent by weight aqueous hydrofluoric acid solutions, and that silica and silicates contained in the test cores were effectively dissolved by the hydrofluoric acid solutions after preflushing the cores with the ammonium chloride solution.

Thus, a method of treating wells for the removal of mud, clays, or other material containing silica and silicates by dissolving said materials in an aqueous solution of hydrochloric acid and hydrofluoric acid is provided by the present invention wherein the formation of insoluble precipitates by the reaction of the acid solution with metallic ions contained in the well, and mud and clay migration are substantially reduced.

Broadly, the present invention relates to introducing ammonium chloride in the form of an aqueous preflush solution, or in particulated solid form dispersed in a carrying fluid, or both, in a well formation to be treated prior to introducing an aqueous treating solution comprised of a mixture of hydrochloric acid and hydrofluoric acid.

We claim:

1. A method of treating wells for the removal of mud, clay or other materials containing silica and silicates which comprises:

introducing a quantity of aqueous ammonium chloride solution into said well so that water contained therein is displaced and clay contained therein is stabilized;

subsequently introducing a quantity of an aqueous solution of hydrochloric acid and hydrofluoric acid into said well whereby said mud, clay, or other materials contained therein are dissolved; and removing said solutions and dissolved materials from said well.

2. The method of claim 1 wherein ammonium chloride is present in said aqueous ammonium chloride solution in an amount of from about 1 percent by weight to a saturated solution.

3. The method of claim 1 wherein said aqueous solution of hydrochloric acid and hydrofluoric acid is comprised of hydrochloric acid present in an amount of from about 5 percent by weight to about 30 percent by weight and hydrofluoric acid present in an amount of from about 1 percent by weight to about 15 percent by weight.

4. The method of claim 1 which is further characterized to include the step of first introducing a quantity of particulated ammonium chloride solids dispersed in a carrying fluid into said well so that the subsequently introduced treating solutions are diverted from areas of high permeability in said well to areas of low permeability therein.

5. The method of claim 4 wherein said carrying fluid is a saturated aqueous ammonium chloride solution.

6. The method of claim 4 wherein said carrying fluid is oil.

7. In a method of treating sand formations of low permeability which contain mud or natural clay wherein an aqueous solution of hydrochloric acid and hydrofluoric acid is introduced into said formation thereby dissolving said mud or natural clay, the improvement comprising:

first introducing an aqueous ammonium chloride solution into said formation so that water contained therein is displaced and said mud or natural clay is stabilized;

subsequently introducing said aqueous solution of hydrochloric acid and hydrofluoric acid into said formation; and removing said solutions from said formation, 8. The method of claim 7 wherein ammonium chloride is present in said aqueous ammonium chloride solution in an amount of from about 1 percent by weight to a saturated solution.

9. The method of claim 7 wherein said aqueous solution of hydrochloric acid and hydrofluoric acid is comprised of hydrochloric acid present in an amount of from about 5 percent by weight to about 30 percent by weight and hydrofluoric acid present in an amount of from about 1 percent by weight to about 15 percent by weight.

10. The method of claim 7 which is further characterized to include the step of first introducing a quantity of particulated ammonium chloride solids dispersed in a carrying fluid into said well so that the subsequently introduced treating solutions are diverted from areas of high permeability in said well to areas of low permeability therein.

11. The method of claim 7 wherein said carrying fluid is a saturated aqueous ammonium chloride solution.

12. The method of claim 7 wherein said carrying fluid is oil.